United States Patent [19]

Kobayashi et al.

[11] 4,122,714
[45] Oct. 31, 1978

[54] MAGNETIC CURRENT METER FOR OPEN CHANNEL FLOW MEASUREMENT

[75] Inventors: Tamotsu Kobayashi; Jun Futamura, both of Yokohama, Japan

[73] Assignee: Hokushin Electric Works, Ltd., Tokyo, Japan

[21] Appl. No.: 846,204

[22] Filed: Oct. 27, 1977

[51] Int. Cl.² .............................................. G01F 1/58
[52] U.S. Cl. ............................... 73/194 EM; 73/291
[58] Field of Search .................. 73/194 EM, 198, 227, 73/291

[56] References Cited

U.S. PATENT DOCUMENTS

| | | | |
|---|---|---|---|
| 3,757,576 | 9/1973 | Rolff et al. | 73/194 EM |
| 3,759,097 | 9/1973 | Cushing | 73/194 EM |
| 3,991,612 | 11/1976 | Mannherz et al. | 73/194 EM |
| 4,036,052 | 7/1977 | Searle | 73/194 EM |

FOREIGN PATENT DOCUMENTS 1,498,323  2/1969  Fed. Rep. of Germany ..... 73/194 EM
1,291,523  3/1969  Fed. Rep. of Germany ..... 73/194 EM

*Primary Examiner*—Charles A. Ruehl
*Attorney, Agent, or Firm*—Michael Ebert

[57] ABSTRACT

A magnetic current meter adapted to sense the flow of liquid through an open channel to produce a mean flow velocity signal that is independent of fluctuations in the level of liquid in the channel. The meter includes a tube of insulation material so positioned in the channel that its longitudinal axis is normal to the direction of flow. Disposed in the tube is a rod having a coil wound thereon, the coil being excited by a low-frequency alternating current to produce an external magnetic field. A pair of electrodes are mounted on opposite sides of the tube on the outer surface thereof whereby the flow of liquid which intercepts the external field induces a voltage signal in the electrodes proportional to the mean flow velocity. The height of the meter exceeds the depth of the channel and is higher, therefore, than the liquid level regardless of fluctuations therein.

8 Claims, 9 Drawing Figures

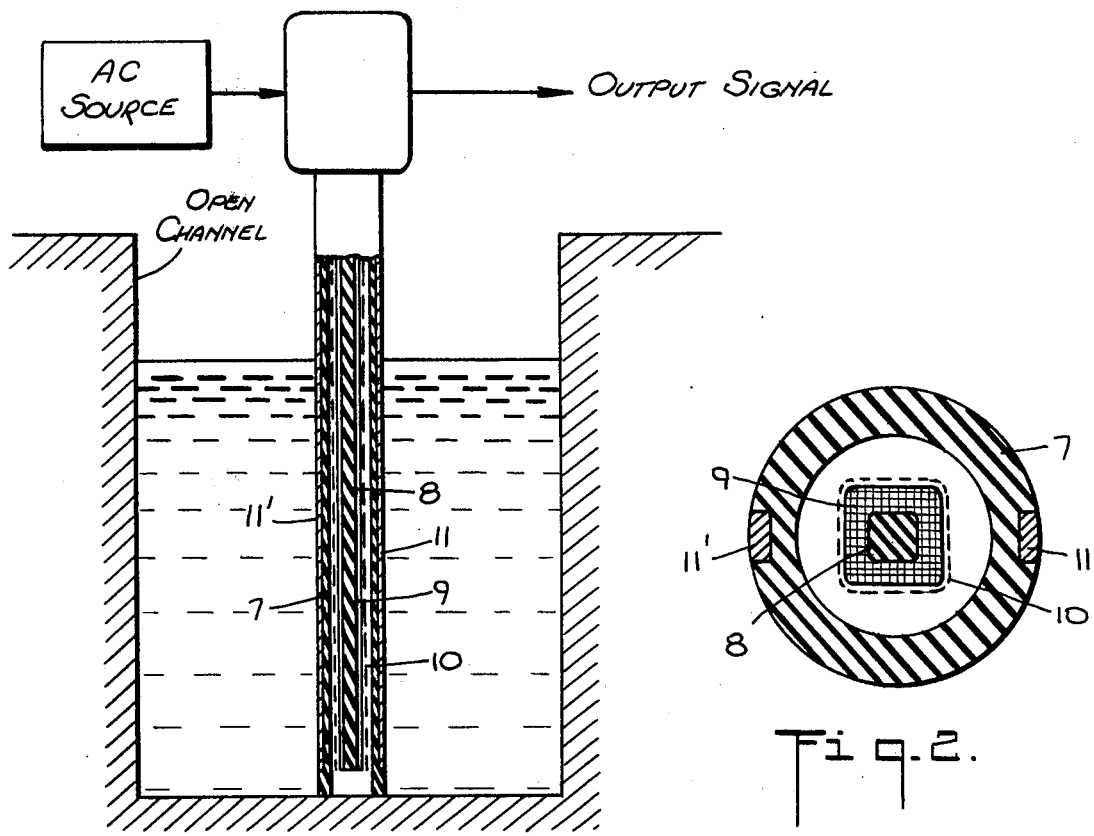
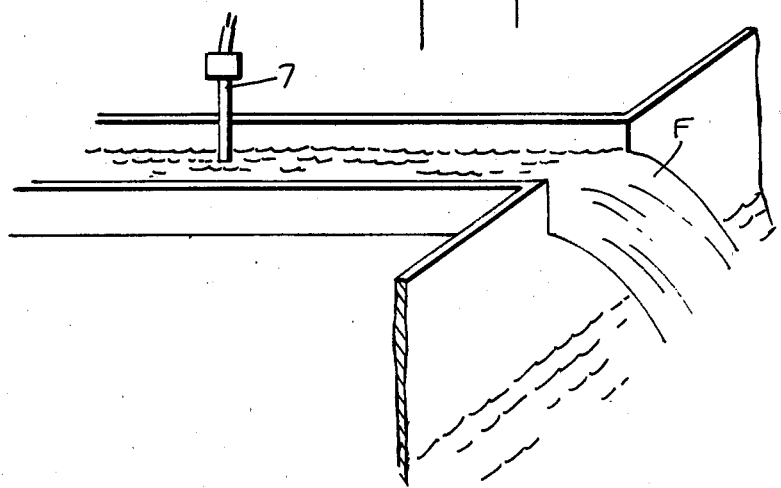
Fig.1.
Fig.2.
Fig.3.

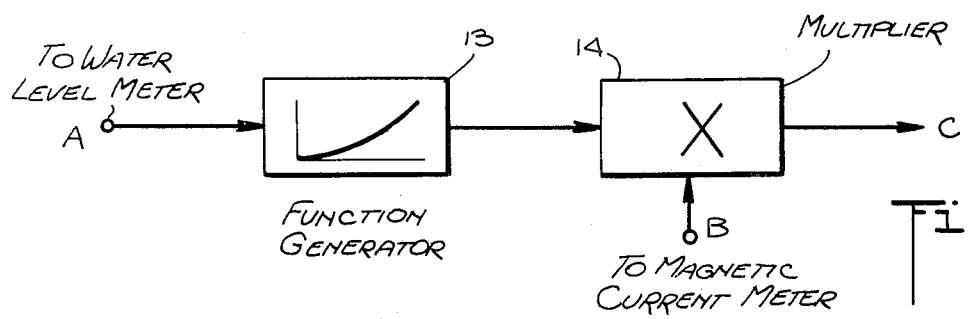
Fig. 4.
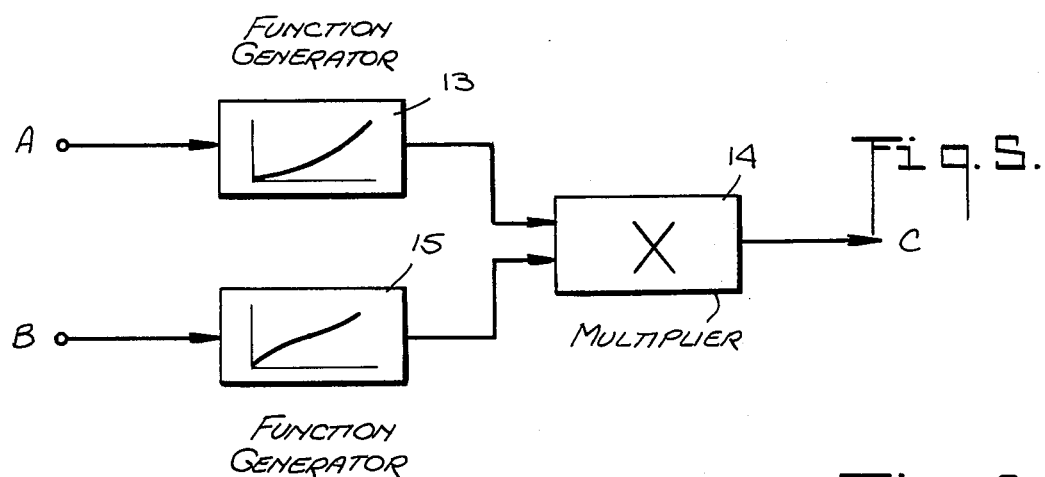
Fig. 5.
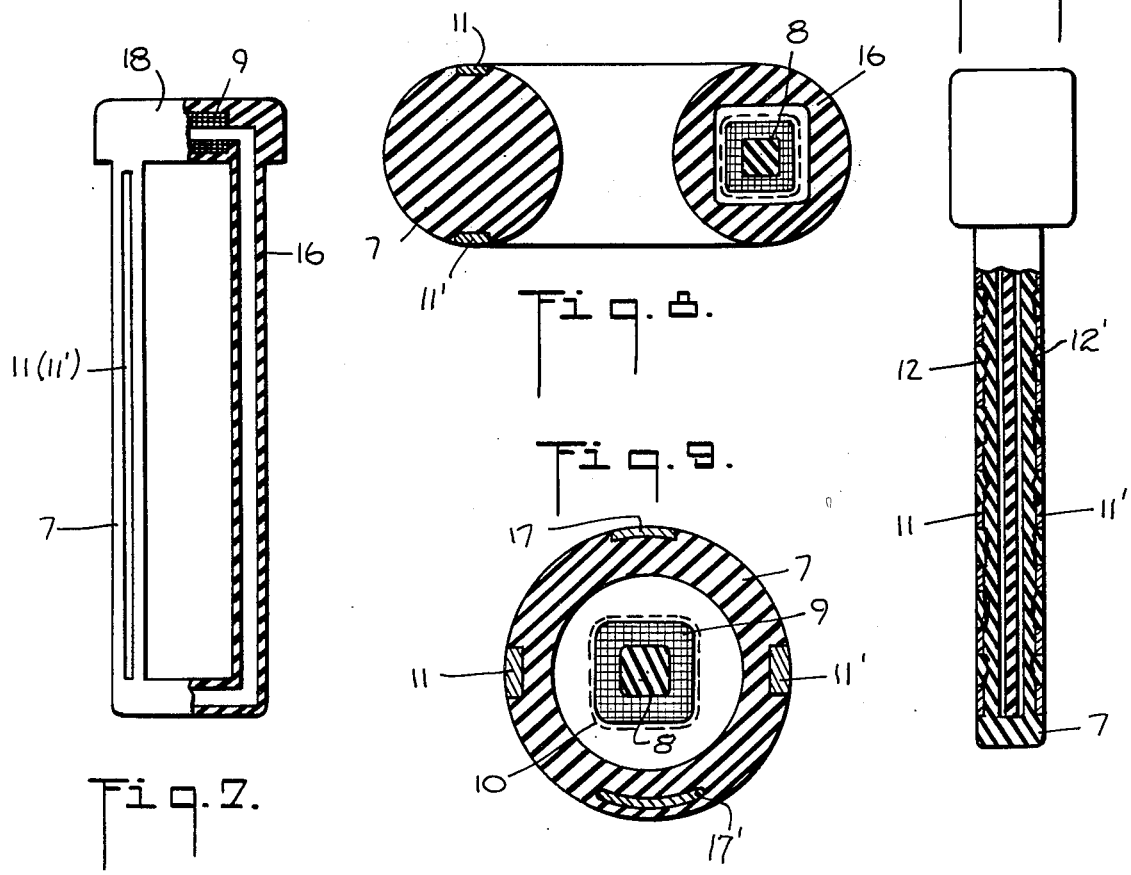

MAGNETIC CURRENT METER FOR OPEN CHANNEL FLOW MEASUREMENT

BACKGROUND OF INVENTION

This invention relates generally to a magnetic current meter for sensing the flow of liquid conducted through an open channel, and more particularly to a meter of this type which produces a mean flow velocity signal that is substantially independent of liquid level fluctuations in the channel.

In order to measure the flow of water or other liquid conducted through an open channel, it is necessary to determine the level of water in the channel as well as the velocity of flow. The cross-sectional area of the flow is normal to the flow direction, and this area is therefore a function of water level. The flow rate of the water through the open channel is obtained by multiplying the mean flow velocity by the cross-sectional area of the flow. To determine the flow velocity, use is generally made of a magnetic current meter.

The sensor of a conventional magnetic current meter includes a pipe of insulating material within which is coaxially disposed a core rod having a coil wound thereon, the coil being surrounded by an electrostatic shield. The remaining free space in the pipe is stuffed with an insulating filler. A pair of button-shaped electrodes are mounted at diametrically-opposed positions on the outer surface of the pipe.

When an alternating-current is supplied to the coil of the sensor, an electromagnetic field is established outside of the pipe whose lines of flux pass in a direction parallel to the axis of the pipe and perpendicular to the diametrical line joining the button electrodes. When the flowing water intersects the magnetic flux of the magnet current meter, a voltage signal proportional to flow velocity is induced in the electrodes in accordance with Faraday's law.

While one can detect the flow velocity with a conventional magnetic current meter in the immediate vicinity of the sensor, it is difficult to determine the mean flow velocity, for the liquid flow through an open channel has a specific flow profile which depends on the configuration of the channel or on the manner in which the channel is constructed. Moreover, the flow profile changes with water level fluctuations.

In a conventional magnetic current meter making use of button electrodes, the voltage signal representing flow velocity that is derived from these electrodes depends on the disposition of the meter sensor. In order, therefore, to obtain a signal which accurately reflects the mean flow velocity, compensation means are required in conjunction with the sensor. That is to say, to derive a mean flow velocity signal with a conventional magnetic current meter positioned at a fixed water level, one must compensate the flow velocity signal produced by the meter with a water level signal.

To this end, when first installing a conventional magnetic current meter in a channel, one must investigate from time to time the relationship between the water level, the flow velocity at the measuring point and the mean flow velocity. And the function generator which is associated with the meter to obtain the mean flow velocity signal must be configured to satisfy this relationship. The drawback to this meter compensation approach is that the more complex the relationship, the less accurate is the compensation.

SUMMARY OF INVENTION

In view of the foregoing, the main object of this invention is to provide an improved magnetic current meter for use in an open channel to sense the flow therein.

More particularly, it is an object of this invention to provide a meter of the above type which produces a signal proportional to the mean flow velocity that is independent of water level fluctuations.

Briefly stated, these objects are attained in one preferred embodiment of a magnetic current meter which includes a tube of insulation material so positioned in the open channel that its longitudinal axis is normal to the direction of liquid flow therein.

Disposed in the tube is a rod having a coil wound thereon, the coil being excited by a low-frequency alternating current to produce an external magnetic field. The height of the meter exceeds the depth of the channel and is higher, therefore, than the liquid level regardless of fluctuations therein. A pair of electrodes is mounted on opposite sides of the tube on the outer surface thereof whereby the flowing liquid which intercepts the external field induces a voltage signal in the electrodes proportional to the mean flow velocity.

OUTLINE OF DRAWINGS

For a better understanding of the invention as well as other objects and further features thereof, reference is made to the following detailed description to be read in conjunction with the accompanying drawings, wherein:

FIG. 1 is a front view, partly in cross-section, of a first embodiment of a magnetic current meter in accordance with the invention;

FIG. 2 is a transverse section taken through the meter shown in FIG. 1;

FIG. 3 illustrates, in perspective, the meter when installed in an open channel;

FIG. 4 is a block diagram of a circuit adapted to calculate the flow rate on the basis of the mean flow velocity signal produced by the magnetic current meter;

FIG. 5 is a block diagram of a circuit to calculate flow rate when the flow profile is complex;

FIG. 6 is a partly sectional view of a second embodiment of a magnetic current meter in accordance with the invention;

FIG. 7 is a partly sectional view of a third embodiment of a meter in accordance with the invention;

FIG. 8 is a transverse section taken in the plane indicated by line D-D' in FIG. 7; and FIG. 9 is a transverse section taken through a fourth embodiment of the invention.

DESCRIPTION OF INVENTION

First Embodiment

Referring now to FIGS. 1 and 2, there is shown a magnetic current meter in accordance with the invention, the meter including a tube 7 which is formed of insulating material and constitutes the meter body. The meter is immersed in an open channel with the longitudinal axis of tube 7 normal to the direction of flow. The length of the tube exceeds the depth of the channel; hence the height of the meter is greater than the level of water in the channel regardless of fluctuations therein.

Disposed centrally within tube 7 is an elongated core 8 having a square cross-section. Wound about core 7 is a coil 9 which is surrounded by an electrostatic shield 10. Seated within longitudinally-extending slots formed in the outer surface of tube 7 at diametrically-opposed positions are elongated electrodes 11 and 11'.

With the meter arrangement shown in FIGS. 1 and 2, the surface area of the elongated electrodes is very large as compared to conventional button electrodes. Hence zero point drift is encountered by reason of eddy currents in the flow. However, this drawback may be overcome by exciting coil 9 with a low-frequency excitation current whose frequency is well below the usual power line frequency (50 or 60 Hz). The low-frequency excitation current preferably has a rectangular rather than a sinusoidal wave form.

The sensor portion of the magnetic current meter (electrodes and excitation coil) is relatively long as compared to conventional meters, and therefore independent of water level fluctuations, however large. When, therefore, one installs the meter in an open channel, as shown in FIG. 3, in which a waterfall F is formed at the downstream end of the channel, the flow profile in the vicinity of the meter is unaffected by the state of downstream flow. In this arrangement, a signal proportional to mean flow velocity is yielded by the meter regardless of water level fluctuations.

In order to calculate the flow rate, a simple circuit arrangement, as shown in FIG. 4, may be used. In this arrangement, signal A from a liquid level meter, is applied to a function generator 13. The cross-sectional area S of the flow in the channel is determined from the liquid level signal. The product C of the detected cross-sectional area value S and the mean velocity signal B from the magnetic current meter in accordance with the invention is calculated by a multiplier 14.

If, however, the flow profile in the vicinity of the magnetic current meter is influenced by the state of downstream flow, the arrangement shown in FIG. 5 is appropriate. In this arrangement, the water level signal A is applied to function generator 13 as in FIG. 4, but the flow velocity signal B from the magnetic current meter is applied to a function generator 15 to effect compensation for the velocity profile. The output of generators 13 and 15 are applied to multiplier 14 to calculate the product C.

Second Embodiment

In the magnetic current meter shown in FIG. 6, instead of longitudinally-extending electrodes on the outer surface of insulation tube 7 as in FIG. 1, use is made of a longitudinal array of spaced electrode pairs 11 and 11'. The spaced electrodes 11 in the series thereof along one side of tube 7 are interconnected by a lead wire 12, while the corresponding electrodes 11' in the series thereof along the opposite side of tube 7 are interconnected by lead wire 12'.

Third Embodiment

In the magnetic current meter shown in FIGS. 7 and 8, instead of an insulating tube, use is made of two parallel rods 7 and 16 formed of insulating material. Mounted on opposite sides of rod 7 in longitudinally-extending slots are elongated electrodes 11 and 11'. Rod 16 is hollow to accommodate an excitation coil (not shown).

Fourth Embodiment

In the magnetic current meter structure shown in FIG. 9, the insulating tube 7 has a rod 8 therein on which a coil 9 is wound, the coil being surrounded by an electrostatic shield 10. Electrodes 11 and 11' are mounted in slots on the surface of tube 7. The arrangement to this extent is essentially the same as shown in FIG. 2.

However, tube 7 in this embodiment is also provided with a grounded electrode 17 and a level-detecting electrode 17' which is diametrically-opposed to grounded electrode 17, electrode 17' being embedded in the tube and being isolated from the water. These two electrodes constitute the capacitor of a capacitive-type level meter.

Thus when tube 7 is immersed in the flowing liquid, the capacitance between electrodes 17 and 17' is determined by the level of the liquid in the channel with respect to the height of tube 7, in that the dielectric properties of water differ from that of air. In order to avoid interference between the mean flow velocity signal obtained from electrodes 11, 11' and the liquid level signal taken from electrodes 17, 17', the power supply associated with the liquid level electrodes is made to operate at a frequency which is significantly higher than the frequency of the excitation current for coil 9.

While there have been shown and described preferred embodiments of a magnetic current meter for open channel flow measurement in accordance with the invention, it will be appreciated that many changes and modifications may be made therein without, however, departing from the essential spirit thereof.

We claim:

1. A magnetic current meter to sense the flow of liquid subject to variations in level through an open channel having a predetermined depth, said meter comprising:
    A. a meter body formed of insulated material and having a longitudinal axis which, when the meter is installed in the channel, lies at right angles to the direction of liquid flow in the channel;
    B. a pair of longitudinally-extending electrodes arranged on the surface of said body on opposite sides of said axis; and
    C. longitudinally-extending coil means disposed within said body to produce an external magnetic field which is intercepted by the flowing liquid to induce a signal in the electrodes which is a function of the mean flow velocity, the height of said body, said electrodes and said coil means in said channel exceeding the depth of said channel and being higher than the level of liquid therein whereby said signal is independent of variations in the level of said liquid.

2. A current meter as set forth in claim 1, wherein said body is formed by a tube, and said coil is wound on a longitudinally-extending rod disposed within said tube.

3. A meter as set forth in claim 2, wherein said coil is surrounded by an electrostatic shield.

4. A magnetic current meter to measure the flow of liquid whose level is subject to variations in level through an open channel having a predetermined depth, said meter comprising:
    A. a tube of insulating material whose longitudinal axis is normal to the direction of liquid flow in said channel when said meter is installed therein;
    B. a longitudinally-extending rod supported within said tube;
    C. a coil wound about said rod;
    D. a pair of longitudinally-extending electrodes mounted at diametrically-opposed positions on the outer surface of said tube, said tube, said electrodes and said coil having a height greater than the depth of said channel; and E. means to supply a low-frequency excitation voltage to said coil to produce an external magnetic field which is intercepted by the flowing liquid to induce a signal in said electrodes proportional to the mean flow velocity and independent of variations in liquid level.

5. A system for determining the flow rate of water flowing through an open channel, said system comprising a magnetic current meter as set forth in claim 4 to produce a first signal representing the mean flow velocity, a liquid level meter installed in said channel to produce a second signal representing the liquid level, and means to multiply the first and second signals to produce a third signal depending on flow rate.

6. A system as set forth in claim 5, wherein said liquid level meter is of the capacitive type and is constituted by a pair of electrodes supported on said tube to sense the liquid level, one electrode being embedded in said tube and the other being on the surface thereof to define a capacitor whose reactance value depends on liquid level.

7. A system as set forth in claim 5, wherein the first signal is applied to the multiplier means through a first function generator.

8. A system as set forth in claim 7, wherein the second signal is applied to the multiplier means through a second function generator.

* * * * *